(12) United States Patent
Johnsen

(10) Patent No.: US 9,346,189 B2
(45) Date of Patent: May 24, 2016

(54) COUPLING DEVICE

(76) Inventor: Anders Johnsen, Borlänge (SE)

( * ) Notice: Subject to any disclaimer, the term of this patent is extended or adjusted under 35 U.S.C. 154(b) by 612 days.

(21) Appl. No.: 13/640,649

(22) PCT Filed: Apr. 11, 2011

(86) PCT No.: PCT/SE2011/050435
§ 371 (c)(1),
(2), (4) Date: Oct. 11, 2012

(87) PCT Pub. No.: WO2011/129751
PCT Pub. Date: Oct. 20, 2011

(65) Prior Publication Data
US 2013/0026719 A1    Jan. 31, 2013

(30) Foreign Application Priority Data

Apr. 14, 2010   (SE) ...................................... 1000376

(51) Int. Cl.
| | |
|---|---|
| *B23B 31/107* | (2006.01) |
| *B28D 7/00* | (2006.01) |
| *B23B 31/00* | (2006.01) |
| *B23B 31/22* | (2006.01) |

(52) U.S. Cl.
CPC ................ *B28D 7/00* (2013.01); *B23B 31/006* (2013.01); *B23B 31/1071* (2013.01); *B23B 31/22* (2013.01); *B23B 2231/026* (2013.01); *B23B 2231/0264* (2013.01); *Y10T 279/17701* (2015.01); *Y10T 279/17717* (2015.01); *Y10T 279/3493* (2015.01)

(58) Field of Classification Search
CPC .............. B23B 31/1071; B23B 31/006; B23B 2231/0264; B23B 31/22; Y10T 279/17717; Y10T 279/3493

USPC ........................................ 279/71, 157, 72, 81
See application file for complete search history.

(56) References Cited

U.S. PATENT DOCUMENTS

| 1,636,421 | A | | 7/1927 | Knott | |
|---|---|---|---|---|---|
| 3,405,950 | A | | 10/1968 | Cox | |
| 3,583,715 | A | | 6/1971 | Jahrl | |
| 3,708,178 | A | * | 1/1973 | Lauricella | ........................ 279/81 |
| 4,722,645 | A | * | 2/1988 | Regan | ........................ 408/239 A |
| 4,824,298 | A | * | 4/1989 | Lippacher et al. | ............. 408/240 |
| 8,366,119 | B2 | * | 2/2013 | Rimet | ............................. 279/71 |
| 8,601,667 | B2 | * | 12/2013 | Norton | ............................ 29/428 |

FOREIGN PATENT DOCUMENTS

DE              3744092          7/1989

* cited by examiner

*Primary Examiner* — Eric A Gates
*Assistant Examiner* — Chwen-Wei Su
(74) *Attorney, Agent, or Firm* — Schwabe Williamson & Wyatt

(57) ABSTRACT

A coupling device for coupling together a tool holder (3) with a rotatable spindle (2) of a machining machine. The coupling device comprises: —a female-shaped coupling part (10) with an internally cone-shaped section (11) and a male-shaped coupling part (20) with an externally cone-shaped section (21); —an annular groove (25) arranged in the externally cone-shaped section; —locking balls (15), which are radially displaceable in radial holes (16) in the internally cone-shaped section; and —a locking sleeve (30), which is arranged on the outside of the female-shaped coupling part and which is rotatable between a releasing position, in which the locking balls can be displaced radially to a retracted position while allowing a mutual axial displacement between the coupling parts, and a locking position, in which the locking balls are kept in engagement in said groove while preventing a mutual axial displacement between the coupling parts. The locking sleeve is provided with radially springing guide members (31), which co-operates with a respective locking ball.

21 Claims, 2 Drawing Sheets

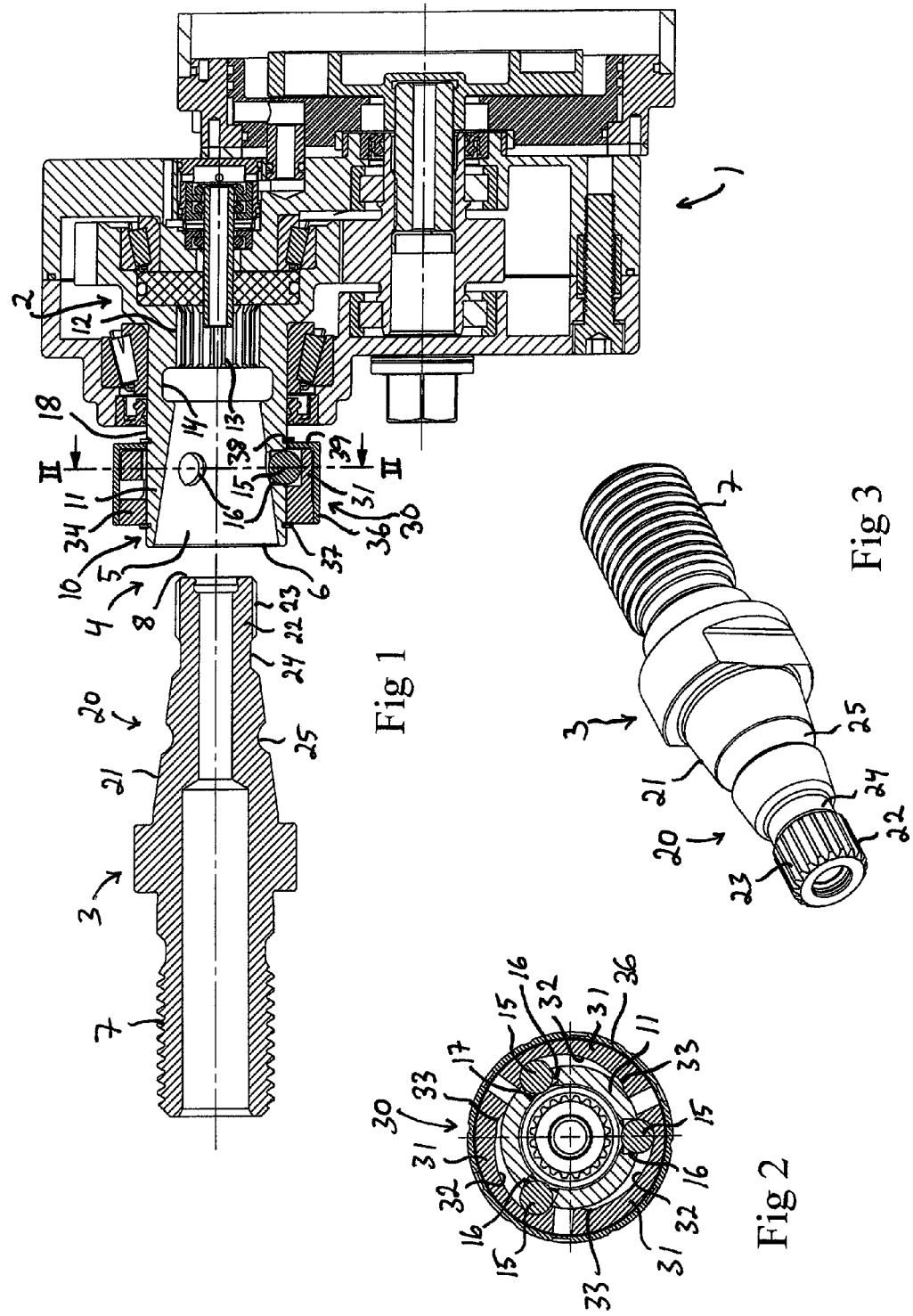

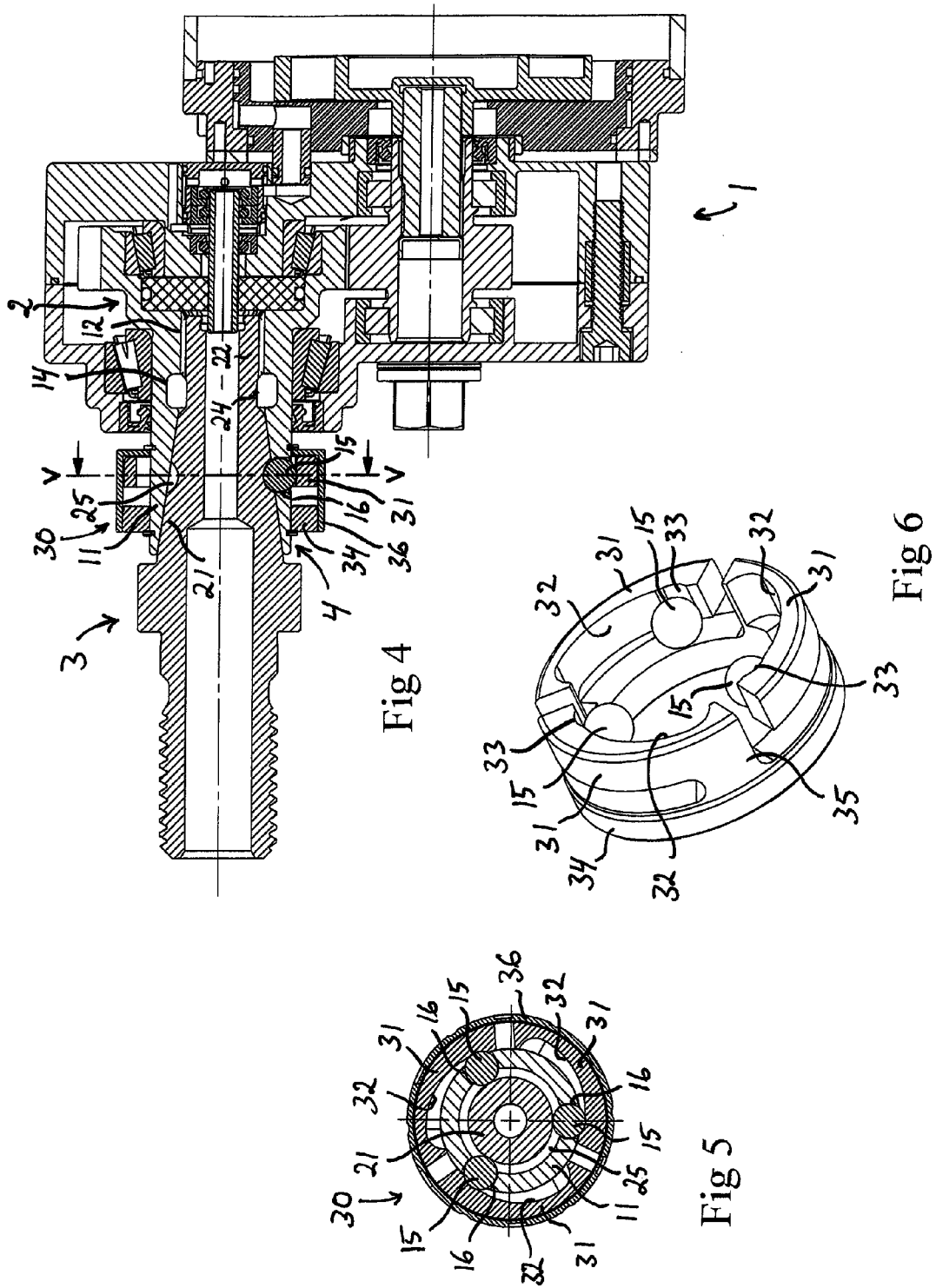

COUPLING DEVICE

FIELD OF THE INVENTION AND PRIOR ART

The present invention relates to a coupling device for coupling together a tool holder with a rotatable spindle of a machining machine.

In a drilling machine of heavier type for making of holes in concrete or other hard materials, a drilling tool, for instance in the form of a drill bit, is often detachably attached to the output shaft of the drilling machine, the so-called spindle, by means of a tool holder which is secured by screwing to the spindle by engagement between a thread on the tool holder and a corresponding thread on the spindle. A disadvantage with such a threaded coupling is that it might be time-consuming to secure the tool holder to the spindle by screwing. It might also be time-consuming and difficult to later unscrew the tool holder from the spindle, since the threaded coupling tightens itself during the drilling procedure. Furthermore, the threads in question run the risk of being damaged, which can make it even more difficult and in the worst case impossible to secure the tool holder to the spindle by screwing.

A coupling device according to the preamble of claim 1 is previously known from U.S. Pat. No. 3,405,950 A.

OBJECT OF THE INVENTION

The object of the present invention is to achieve a further development of a coupling device of the type described in U.S. Pat. No. 3,405,950 A so as to provide a coupling device with a design which in at least some aspect offers an advantage as compared to this previously known coupling device.

SUMMARY OF THE INVENTION

According to the present invention, said object is achieved by a coupling device having the features defined herein.

The coupling device according to the invention comprises:
- a female-shaped coupling part and a corresponding male-shaped coupling part, the female-shaped coupling part being fixedly connected to the spindle and being provided with an internally cone-shaped section, whereas the male-shaped coupling part is fixedly connected to the tool holder and is provided with an externally cone-shaped section which is configured for engagement with said internally cone-shaped section;
- an annular groove arranged in the externally cone-shaped section, this groove extending in one turn around this section;
- at least two locking balls, which are received in a respective radial through hole in said internally cone-shaped section while being radially displaceable in this hole, these holes being distributed in the circumferential direction of this section and arranged to be aligned with the groove in the externally cone-shaped section when the male-shaped coupling part is inserted in the female-shaped coupling part with the cone-shaped sections in engagement with each other; and
- a locking sleeve which is rotatably arranged on the outside of the female-shaped coupling part outwardly of the internally cone-shaped section and the locking balls, the locking sleeve being rotatable to and fro between a releasing position, in which the locking sleeve allows the respective locking ball to be displaced radially to a retracted position while allowing a mutual axial displacement between said coupling parts, and a locking position, in which the locking sleeve forces the respective locking ball to assume an advanced position with the locking ball extending through the inwards facing opening of the associated hole and down into the groove in the externally cone-shaped section while preventing a mutual axial displacement between said coupling parts.

The locking sleeve is provided with at least two radially springing guide members, wherein the respective guide member co-operates with one of said locking balls and is arranged to be rotated together with the locking sleeve and be pressed against the associated locking ball in order to lock this in said advanced position when the locking sleeve is rotated from said releasing position to said locking position.

With the coupling device according to the invention, the tool holder is in a rapid and simple manner guided into the correct position in relation to the spindle under the effect of the mutually co-operating cone-shaped sections of said male-shaped and female-shaped coupling parts. The tool holder may then with a simple manipulation be locked to the spindle by rotating the locking sleeve so that the locking balls of the female-shaped coupling part is brought into locking engagement with the groove in the male-shaped coupling part and thereby prevent a mutual axial displacement between the tool holder and the spindle. The tool holder may with a corresponding simple manipulation be released from the spindle by rotating the locking sleeve in the opposite direction so that the locking balls will be free to be displaced radially out of the groove in the male-shaped coupling part and thereby allow an axial displacement of the tool holder away from the spindle. Owing to the fact that that the guide members which act against the locking balls in order to lock these in the advanced position are radially springing, the manoeuvring of the locking sleeve from the releasing position to the locking position and from the locking position to the releasing position is facilitated. By using radially springing guide members, the tolerance requirements on the locking sleeve and its guide members will in addition be comparatively low, which facilitates the manufacturing of the locking sleeve.

According to an embodiment of the invention, the locking sleeve comprises a ring-shaped holder, which extends around the female-shaped coupling part and via which the locking sleeve slideably bears against the envelope surface of the female-shaped coupling part, the guide members being springingly fixed to this ring-shaped holder. By having the guide members springingly suspended jointly in a ring-shaped holder, the desired radially springing characteristic of the guide members can be achieved in a simple manner.

Another embodiment of the invention is characterized in:
- that the internally cone-shaped section of the female-shaped coupling part at one of its ends is connected to an internally cylindrical section; and
- that the externally cone-shaped section of the male-shaped coupling part at one of its ends is connected to an externally cylindrical section, which is configured for engagement with the internally cylindrical section for transmitting torque between the female-shaped coupling part and the male-shaped coupling part when the male-shaped coupling part is inserted in the female-shaped coupling part with the cone-shaped sections in engagement with each other.

Hereby, a mutual rotation between the tool holder and the spindle when connected to each other is prevented in a simple and efficient manner.

Other favourable features of the coupling device according to the invention will appear from the description following below.

BRIEF DESCRIPTION OF THE DRAWINGS

The invention will in the following be more closely described by means of embodiment examples, with reference to the appended drawings.

It is shown in:

FIG. 1 a longitudinal section through a tool holder and a spindle provided with a coupling device according to an embodiment of the present invention, with the tool holder shown released from the spindle, FIG. 2 a section according to the line II-II in FIG. 1, FIG. 3 a perspective view of the tool holder of FIG. 1, FIG. 4 a longitudinal section through the tool holder and the spindle of FIG. 1, with these shown connected to each other, FIG. 5 a section according to the line V-V in FIG. 4, and FIG. 6 a perspective view of components included in the coupling device of FIG. 1.

DETAILED DESCRIPTION OF PREFERRED EMBODIMENTS

FIG. 1 shows a part of a machining machine 1 with an output shaft in the form of a spindle 2 and a tool holder 3, which is connectable to the spindle. The spindle 2 is rotatably mounted and arranged to be rotated under the effect of a drive motor (not shown) of the machining machine. The tool holder 3 and the spindle 2 are connectable to each other by means of a coupling device 4 according to the present invention. The spindle 2 is hollow and provided with a recess 5 which extends axially into the spindle 2 from an outwards facing opening 6 at the outer end of the spindle.

The coupling device 4 comprises a female-shaped coupling part 10 which is fixedly connected to the spindle 2, and a corresponding male-shaped coupling part 20 which is fixedly connected into the tool holder 3. The female-shaped coupling part 10 is provided with an internally cone-shaped section 11. The male-shaped coupling part 20 is provided with a corresponding externally cone-shaped section 21, which is configured for engagement with said internally cone-shaped section 11 of the female-shaped coupling part.

The internally cone-shaped section 11 of the female-shaped coupling part 10 has the form of a truncated cone and is at its narrower end connected to an internally cylindrical section 12, which is provided with internal axial splines 13. In the illustrated embodiment, the internally cone-shaped section 11 is connected to said cylindrical section 12 via an annular bulge 14 in the recess 5, which bulge 14 has a larger internal diameter than the cylindrical section 12. The externally cone-shaped section 21 of the male-shaped coupling part 20 also has the form of a truncated cone and is at its narrower end connected to an externally cylindrical section 22, which is provided with external axial splines 23 configured for engagement with said internal splines 13 of the internally cylindrical section 12 when the male-shaped coupling part 20 is inserted in the female-shaped coupling part 10 with the cone-shaped sections 11, 21 in engagement with each other, as illustrated in FIG. 4. As an alternative to axial splines, said sections 12, 22 could have mutually complementary polygonal cross-sectional shapes, such as for instance quadrangular or hexagonal cross-sectional shapes, for transmitting torque between the coupling parts 10, 20. In the illustrated embodiment, the externally cone-shaped section 21 is connected to said cylindrical section 22 via an annular recess 24 on the male-shaped coupling part 20, which recess 24 has a smaller diameter than the cylindrical section 22. This recess 24 is arranged to be in level with the above-mentioned annular bulge 14 when the male-shaped coupling part 20 is inserted in the female-shaped coupling part 10 with the cone-shaped sections 11, 21 in engagement with each other, as illustrated in FIG. 4.

An annular groove 25 is arranged in the externally cone-shaped section 21 of the male-shaped coupling part 20. This groove 25 extends in one turn around this section 21.

A number locking balls 15, which are at least two in number but suitably three or more, are received in a respective radial through hole 16 in the internally cone-shaped section 11 of the female-shaped coupling part while being radially displaceable in this hole. The respective locking ball 15 has a diameter which is larger than the radial depth of the associated hole 16. The holes 16 are distributed in the circumferential direction of the internally cone-shaped section 11 and arranged to be aligned with the groove 25 in the externally cone-shaped section 22 when the male-shaped coupling part 20 is inserted in the female-shaped coupling part 10 with the cone-shaped sections 11, 21 in engagement with each other, as illustrated in FIG. 4. The respective hole 16 is provided with a small shoulder 17 (see FIG. 2) at its inwards facing hole opening, which shoulder is arranged to co-operate with the locking ball 15 received in the hole in order to limit the displaceability of this locking ball in the radial direction inwards and thereby prevent the locking ball from falling out of the hole 16 and into the recess 5.

A locking sleeve 30 is rotatably arranged on the outside of the female-shaped coupling part 10 outwardly of the internally cone-shaped section 11 and the locking balls 15. This locking sleeve 30 is rotatable to and fro between a releasing position (see FIGS. 1 and 2), in which the locking sleeve 30 allows the respective locking ball 15 to be displaced radially outwards to a retracted position while allowing a mutual axial displacement between the coupling parts 10, 20, and a locking position (see FIGS. 4 and 5), in which the locking sleeve 30 forces the respective locking ball 15 to assume an advance position with the locking ball extending through the inwards facing hole opening of the associated hole 16 and down into the groove 25 in the externally cone-shaped section 21 while preventing a mutual axial displacement between the coupling parts 10, 20.

The locking balls 15 co-operates with a respective internal and radially springing guide member 31 of the locking sleeve 30, the respective guide member 31 being arranged to be rotated together with the locking sleeve 30 and be pressed against the associated locking ball 15 in order to lock this in said advanced position when the locking sleeve 30 is rotated from the releasing position to the locking position. The respective guide member 31 is springingly suspended in the locking sleeve 30 and is provided with an internal guide cam 32, along which the associated locking ball 15 is displaced in connection with a rotation of the locking sleeve 30 between the releasing position and the locking position. This guide cam 32 is at one of its ends provided with a recess 33 (see FIGS. 2 and 6), in which the associated locking ball 15 is arranged to be received when the locking sleeve 30 is in the locking position to thereby retain the locking sleeve in the locking position. The respective guide cam 32 has such a shape that the radial interspace between the inwards facing surface of the guide cam and the outwards facing hole opening of the hole 16 of the associated locking ball is larger when the locking sleeve 30 is in the releasing position than when the locking sleeve is in the locking position. The guide members 31 are distributed in the circumferential direction of the locking sleeve and separated from each other in the circumferential direction of the locking sleeve by intermediate gaps.

In the illustrated embodiment, the locking sleeve 30 comprises a ring-shaped holder 34, which extends around the female-shaped coupling part 10 and via which the locking sleeve 30 slideably bears against the envelope surface 18 of the female-shaped coupling part. The respective guide member 31 is at one of its ends, to be more precise at the end of the guide member which is closest to the associated locking ball 15 when the locking sleeve 30 is in the releasing position, fixed to this holder 34 via an axially extending connecting section 35 (see FIG. 6). The other end of the guide member 31, i.e. the end which is closest to the associated locking ball 15 when the locking sleeve 30 is in the locking position, hangs freely in relation to the holder 34 and is thereby radially springing. As appears from FIG. 6, the respective guide member 31 extends in parallel with the holder 34 at an axial distance from the holder. The holder 34 and the guide members 31 are suitably formed in one piece, preferably of steel. Furthermore, the locking sleeve 30 comprises an external protective casing 36, which surrounds the holder 34 and the guide members 31. In the illustrated example, the locking sleeve 30 is kept in place in the axial direction on the female-shaped coupling part 10 between two lock rings 37, 38, which engage in a respective external groove in the female-shaped coupling part 10. One 37 of these lock rings bears against the holder 34, whereas the other lock ring 38 bears against a radially extending flange 39 on the protective casing 36.

In the illustrated embodiment, the coupling device 4 comprises three locking balls 15 and three radially springing guide members 31.

The above-mentioned annular groove 25 in the conical section 21 of the male-shaped coupling part has with advantage a concave shape as seen in a longitudinal section through the male-shaped coupling part 20, as appears from FIGS. 1 and 4. In the illustrated embodiment, this groove 25 has, as seen in a longitudinal section through the male-shaped coupling part, the shape of a circular arc. The groove 25 could however also have another shape.

The coupling parts 10, 20 are so configured that the end surface 8 of the end of the tool holder 3 that is received in the recess 5 of the spindle is not in contact with the bottom surface of the recess when the tool holder 3 is connected to the spindle 2. On the contrary, this end surface 8 is at a distance from said bottom surface when the tool holder is connected to the spindle, as illustrated in FIG. 4.

In the illustrated example, the tool holder 3 is at its outwards facing end provided with a thread 7, which is intended for engagement with a corresponding thread of a tool, for instance in the form of a drilling tool or a saw tool. The tool holder 3 could alternatively be fixedly connected to a tool.

When the tool holder 3 is to be attached to the spindle 2, the locking sleeve 30 is placed in the releasing position, whereupon the male-shaped coupling part 20 of the tool holder 3 is displaced axially into the female-shaped coupling part 10 of the spindle 2 through the opening 6 of the recess 5 of the spindle so that the externally cone-shaped section 21 of the male-shaped coupling part comes into engagement with the internally cone-shaped section 11 of the female-shaped coupling part, which implies that the above-mentioned splines 23 of the cylindrical section 22 of the male-shaped coupling part comes into engagement with the corresponding splines 13 of the cylindrical section 12 of the female-shaped coupling part and that the groove 25 in the male-shaped coupling part comes on a level with the holes 16 of the female-shaped coupling part. Thereafter, the locking sleeve 30 is rotated from the releasing position to the locking position. During this rotation, the locking balls 15 are gradually pressed down into the groove 25 under the effect of the guide members 31, the locking balls 15 in their turn pressing the male-shaped coupling part 20 a short distance axially inwards into the female-shaped coupling part 10 so that the cone-shaped sections 11, 20 are pressed tightly against each other. When the locking sleeve 30 reaches the locking position, the respective locking ball 15 comes into engagement in the recess 33 on the guide cam 32 of the associated guide member, whereby the locking sleeve 30 is retained in the locking position. The tool holder 3 is now connected to the spindle 2 and is by the engagement of the locking balls in the groove 25 prevented from being displaced in relation to the spindle, at the same time as the tool holder by the mutual engagement between the above-mentioned splines 13, 23 is prevented from rotating in relation to the spindle 2.

When the tool holder 3 is to be released from the spindle 2, the locking sleeve 30 is rotated in the opposite direction from the locking position to the releasing position, whereby the male-shaped coupling part 20 of the tool holder 3 can be displaced axially out of the female-shaped coupling part 10 of the spindle 2 at the same time as the locking balls 15 are pressed radially outwards out of engagement with the groove 25.

The coupling device according to the invention is particularly intended to be used in a machining machine in the form of a heavier drilling machine or sawing machine for making of holes and sawing, respectively, in concrete or other hard materials.

The invention is of course not in any way limited to the embodiments described above. On the contrary, several possibilities to modifications thereof should be apparent to a person skilled in the art without thereby deviating from the basic idea of the invention as defined in the appended claims.

The invention claimed is:

1. A coupling device for coupling together a tool holder (3) with a rotatable spindle (2) of a machining machine, which coupling device (4) comprises:

a female-shaped coupling part (10) and a corresponding male-shaped coupling part (20), the female-shaped coupling part (10) being fixedly connected to the spindle (2) and being provided with an internally cone-shaped section (11), whereas the male-shaped coupling part (20) is fixedly connected to the tool holder (3) and is provided with an externally cone-shaped section (21) which is configured for engagement with said internally cone-shaped section (11);

an annular groove (25) arranged in the externally cone-shaped section (21), this groove (25) extending in one turn around this section (21);

at least two locking balls (15), which are received in a respective radial through hole (16) in said internally cone-shaped section (11) while being radially displaceable in this hole, these holes (16) being distributed in the circumferential direction of this section (11) and arranged to be aligned with the groove (25) in the externally cone-shaped section (21) when the male-shaped coupling part (20) is inserted in the female-shaped coupling part (10) with the cone-shaped sections (11, 21) in engagement with each other; and a locking sleeve (30) which is rotatably arranged on the outside of the female-shaped coupling part (10) outwardly of the internally cone-shaped section (11) and the locking balls (15), the locking sleeve (30) being rotatable to and fro between a releasing position, in which the locking sleeve (30) allows the respective locking ball (15) to be displace radially to a retracted position while allowing a mutual axial displacement between said coupling parts (10, 20), and a locking position, in which the locking sleeve (30) forces the respective locking ball (15) to assume an advanced position with the locking ball (15) extending through the inwards facing opening of the associated hole (16) and down into the groove (25) in the externally cone-shaped section (21) while preventing a mutual axial displacement between said coupling parts (10, 20), wherein the locking sleeve (30) is provided with at least two separate radially springing guide members (31) separately mounted on the locking sleeve (30) from one another, and the respective guide member (31) co-operates with one of said locking balls (15) and is arranged to be rotated together with the locking sleeve (30) and be pressed against the associated locking ball (15) to lock this locking ball (15) in said advanced position when the locking sleeve (30) is rotated from said releasing position to said locking position.

2. A coupling device according to claim 1, wherein the respective guide member (31) is springingly suspended in the locking sleeve (30).

3. A coupling device according to claim 2, wherein the locking sleeve (30) comprises a ring-shaped holder (34), which extends around the female-shaped coupling part (10) and via which the locking sleeve (30) slideably bears against an envelope surface (18) of the female-shaped coupling part (10), the guide members (31) being springingly fixed to this ring-shaped holder (34).

4. A coupling device according to claim 3, wherein the respective guide member (31) at one of its ends is fixed to the ring-shaped holder (34) via an axially extending connecting section (35).

5. A coupling device according to claim 4, wherein the ring-shaped holder (34) and the guide members (31) are formed in one piece.

6. A coupling device according to claim 5, wherein the locking sleeve (30) comprises an external protective casing (36) which surrounds the ring-shaped holder (34) and the guide members (31).

7. A coupling device according to claim 6, wherein the respective guide member (31) is provided with an internal guide cam (32), along which the associated locking ball (15) is displaced in connection with a rotation of the locking sleeve (30) between said releasing position and said locking position, this guide cam (32) being at one of its ends provided with a recess (33), in which the associated locking ball (15) is arranged to be received when the locking sleeve (30) is in said locking position to thereby retain the locking sleeve in the locking position.

8. A coupling device according to claim 5, wherein the respective guide member (31) is provided with an internal guide cam (32), along which the associated locking ball (15) is displaced in connection with a rotation of the locking sleeve (30) between said releasing position and said locking position, this guide cam (32) being at one of its ends provided with a recess (33), in which the associated locking ball (15) is arranged to be received when the locking sleeve (30) is in said locking position to thereby retain the locking sleeve in the locking position.

9. A coupling device according to claim 4, wherein the locking sleeve (30) comprises an external protective casing (36) which surrounds the ring-shaped holder (34) and the guide members (31).

10. A coupling device according to claim 9, wherein the respective guide member (31) is provided with an internal guide cam (32), along which the associated locking ball (15) is displaced in connection with a rotation of the locking sleeve (30) between said releasing position and said locking position, this guide cam (32) being at one of its ends provided with a recess (33), in which the associated locking ball (15) is arranged to be received when the locking sleeve (30) is in said locking position to thereby retain the locking sleeve in the locking position.

11. A coupling device according to claim 3, wherein the ring-shaped holder (34) and the guide members (31) are formed in one piece.

12. A coupling device according to claim 11, wherein the locking sleeve (30) comprises an external protective casing (36) which surrounds the ring-shaped holder (34) and the guide members (31).

13. A coupling device according to claim 12, wherein the respective guide member (31) is provided with an internal guide cam (32), along which the associated locking ball (15) is displaced in connection with a rotation of the locking sleeve (30) between said releasing position and said locking position, this guide cam (32) being at one of its ends provided with a recess (33), in which the associated locking ball (15) is arranged to be received when the locking sleeve (30) is in said locking position to thereby retain the locking sleeve in the locking position.

14. A coupling device according to claim 11, wherein the ring-shaped holder (34) and the guide members (31) are formed of steel.

15. A coupling device according to claim 3, wherein the locking sleeve (30) comprises an external protective casing (36) which surrounds the ring-shaped holder (34) and the guide members (31).

16. A coupling device according to claim 1, wherein the coupling device comprises three locking balls (15) and three radially springing guide members (31).

17. A coupling device according to claim 1, wherein said groove (25) has a concave shape as seen in a longitudinal section through the male-shaped coupling part (20).

18. A coupling device according to claim 1, wherein
the internally cone-shaped section (11) of the female-shaped coupling part (10) at one of its ends is connected to an internally cylindrical section (12); and
the externally cone-shaped section (21) of the male-shaped coupling part (20) at one of its ends is connected to an externally cylindrical section (22), which is configured for engagement with the internally cylindrical section (12) for transmitting torque between the female-shaped coupling part and the male-shaped coupling part when the male-shaped coupling part (20) is inserted in the female-shaped coupling part (10) with the cone-shaped sections (11, 21) in engagement with each other.

19. A coupling device according to claim 18, wherein:
the internally cylindrical section (12) of the female-shaped coupling part (10) is provided with internal axial splines (13); and
the externally cylindrical section (22) of the male-shaped coupling part (20) is provided with external axial splines (23) configured for engagement with said internal splines (13) of the internally cylindrical section (12) for transmitting torque between the female-shaped coupling part and the male-shaped coupling part when the male-shaped coupling part (20) is inserted in the female-shaped coupling part (10) with the cone-shaped sections (11, 21) in engagement with each other.

20. A coupling device for coupling together a tool holder (3) with a rotatable spindle (2) of a machining machine, which coupling device (4) comprises:
a female-shaped coupling part (10) and a corresponding male-shaped coupling part (20), the female-shaped coupling part (10) being fixedly connected to the spindle (2) and being provided with an internally cone-shaped section (11), whereas the male-shaped coupling part (20) is fixedly connected to the tool holder (3) and is provided with an externally cone-shaped section (21) which is configured for engagement with said internally cone-shaped section (11);

an annular groove (25) arranged in the externally cone-shaped section (21), this groove (25) extending in one turn around this section (21);

at least two locking balls (15), which are received in a respective radial through hole (16) in said internally cone-shaped section (11) while being radially displaceable in this hole, these holes (16) being distributed in the circumferential direction of this section (11) and arranged to be aligned with the groove (25) in the externally cone-shaped section (21) when the male-shaped coupling part (20) is inserted in the female-shaped coupling part (10) with the cone-shaped sections (11, 21) in engagement with each other; and a locking sleeve (30) which is rotatably arranged on the outside of the female-shaped coupling part (10) outwardly of the internally cone-shaped section (11) and the locking balls (15), the locking sleeve (30) being rotatable to and fro between a releasing position, in which the locking sleeve (30) allows the respective locking ball (15) to be displace radially to a retracted position while allowing a mutual axial displacement between said coupling parts (10, 20), and a locking position, in which the locking sleeve (30) forces the respective locking ball (15) to assume an advanced position with the locking ball (15) extending through the inwards facing opening of the associated hole (16) and down into the groove (25) in the externally cone-shaped section (21) while preventing a mutual axial displacement between said coupling parts (10, 20), wherein the locking sleeve (30) is provided with at least two radially springing guide members (31), the respective guide member (31) co-operates with one of said locking balls (15) and is arranged to be rotated together with the locking sleeve (30) and be pressed against the associated locking ball (15) to lock this locking ball (15) in said advanced position when the locking sleeve (30) is rotated from said releasing position to said locking position, the respective guide member (31) is provided with an internal guide cam (32), along which the associated locking ball (15) is displaced in connection with a rotation of the locking sleeve (30) between said releasing position and said locking position, this guide cam (32) being at one of its ends provided with a recess (33), in which the associated locking ball (15) is arranged to be received when the locking sleeve (30) is in said locking position to thereby retain the locking sleeve in the locking position, the locking sleeve (30) comprises a ring-shaped holder (34), which extends around the female-shaped coupling part (10) and via which the locking sleeve (30) slidably bears against an envelope surface (18) of the female-shaped coupling part (10), the guide members (31) being springingly fixed to this ring-shaped holder (34), the respective guide member (31) at one of its ends is fixed to the ring-shaped holder (34) via an axially extending connecting section (35), and the recess (33) being provided at an end of the internal guide cam (32) of the respective guide member (31) remote from the axially extending connecting section (35).

21. A coupling device for coupling together a tool holder (3) with a rotatable spindle (2) of a machining machine, which coupling device (4) comprises:

a female-shaped coupling part (10) and a corresponding male-shaped coupling part (20), the female-shaped coupling part (10) being fixedly connected to the spindle (2) and being provided with an internally cone-shaped section (11), whereas the male-shaped coupling part (20) is fixedly connected to the tool holder (3) and is provided with an externally cone-shaped section (21) which is configured for engagement with said internally cone-shaped section (11);

an annular groove (25) arranged in the externally cone-shaped section (21), this groove (25) extending in one turn around this section (21);

at least two locking balls (15), which are received in a respective radial through hole (16) in said internally cone-shaped section (11) while being radially displaceable in this hole, these holes (16) being distributed in the circumferential direction of this section (11) and arranged to be aligned with the groove (25) in the externally cone-shaped section (21) when the male-shaped coupling part (20) is inserted in the female-shaped coupling part (10) with the cone-shaped sections (11, 21) in engagement with each other; and a locking sleeve (30) which is rotatably arranged on the outside of the female-shaped coupling part (10) outwardly of the internally cone-shaped section (11) and the locking balls (15), the locking sleeve (30) being rotatable to and fro between a releasing position, in which the locking sleeve (30) allows the respective locking ball (15) to be displace radially to a retracted position while allowing a mutual axial displacement between said coupling parts (10, 20), and a locking position, in which the locking sleeve (30) forces the respective locking ball (15) to assume an advanced position with the locking ball (15) extending through the inwards facing opening of the associated hole (16) and down into the groove (25) in the externally cone-shaped section (21) while preventing a mutual axial displacement between said coupling parts (10, 20), wherein the locking sleeve (30) is provided with at least two radially springing guide members (31), the respective guide member (31) co-operates with one of said locking balls (15) and is arranged to be rotated together with the locking sleeve (30) and be pressed against the associated locking ball (15) to lock this locking ball (15) in said advanced position when the locking sleeve (30) is rotated from said releasing position to said locking position, the locking sleeve (30) comprises an external protective casing (36) which surrounds the ring-shaped holder (34) and the guide members (31), and the respective guide member (31) is provided with an internal guide cam (32), along which the associated locking ball (15) is displaced in connection with a rotation of the locking sleeve (30) between said releasing position and said locking position, this guide cam (32) being at one of its ends provided with a recess (33), in which the associated locking ball (15) is arranged to be received when the locking sleeve (30) is in said locking position to thereby retain the locking sleeve in the locking position.

* * * * *